US012763414B2

(12) United States Patent
Cho et al.

(10) Patent No.: US 12,763,414 B2
(45) Date of Patent: Oct. 13, 2026

(54) PROPYLENE-BASED MULTI-LAYER FILM FOR CELL POUCH, HAVING EXCELLENT ADHESIVE PERFORMANCE AND MOLDABILITY

(71) Applicant: LOTTE CHEMICAL CORPORATION, Seoul (KR)

(72) Inventors: Jin Ju Cho, Daejeon (KR); Min Kyu Kim, Daejeon (KR); Joon Gyu Ahn, Daejeon (KR); Hyun Sup Lee, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 716 days.

(21) Appl. No.: 18/253,531

(22) PCT Filed: Nov. 9, 2021

(86) PCT No.: PCT/KR2021/016269
§ 371 (c)(1),
(2) Date: May 18, 2023

(87) PCT Pub. No.: WO2022/114604
PCT Pub. Date: Jun. 2, 2022

(65) Prior Publication Data

US 2024/0372189 A1 Nov. 7, 2024

(30) Foreign Application Priority Data

Nov. 24, 2020 (KR) ........................ 10-2020-0159121

(51) Int. Cl.

| | |
|---|---|
| ***H01M 50/197*** | (2021.01) |
| ***B32B 27/08*** | (2006.01) |
| ***B32B 27/18*** | (2006.01) |
| ***B32B 27/32*** | (2006.01) |
| ***H01M 50/105*** | (2021.01) |
| ***H01M 50/129*** | (2021.01) |
| ***H01M 50/193*** | (2021.01) |

(52) U.S. Cl.
CPC ........... *H01M 50/197* (2021.01); *B32B 27/08* (2013.01); *B32B 27/18* (2013.01); *B32B 27/32* (2013.01); *H01M 50/105* (2021.01); *H01M 50/129* (2021.01); *H01M 50/193* (2021.01); *B32B 2250/03* (2013.01); *B32B 2250/242* (2013.01); *B32B 2307/30* (2013.01); *B32B 2307/702* (2013.01); *B32B 2307/7376* (2023.05); *B32B 2307/746* (2013.01); *B32B 2457/10* (2013.01)

(58) Field of Classification Search
CPC ............. H01M 50/197; H01M 50/105; H01M 50/129; H01M 50/193; H01M 50/136; H01M 50/124; H01M 50/116; H01M 10/052; B32B 27/08; B32B 27/18; B32B 27/32; B32B 2250/03; B32B 2250/242; B32B 2307/30; B32B 2307/702; B32B 2307/7376; B32B 2307/746; B32B 2307/414; B32B 2307/54; B32B 2307/748; B32B 2457/10; B32B 2264/303; B32B 2264/1021; B32B 2264/202; B32B 2270/00; B32B 2439/46; B32B 25/08; B32B 15/085; B32B 2311/24; Y02E 60/10; C08F 210/16; C08F 210/06
See application file for complete search history.

(56) References Cited

U.S. PATENT DOCUMENTS 6,399,707 B1 * 6/2002 Meka ...................... C08L 23/10 525/240
2004/0220320 A1 * 11/2004 Abhari .................... C08L 23/12 524/502
2008/0160276 A1 * 7/2008 Inoue .................... C01B 33/193 521/76
2008/0241663 A1 10/2008 Yamashita et al.
2010/0081755 A1 * 4/2010 Rhee ........................ C08F 10/06 525/240
2012/0064331 A1 * 3/2012 Wollack .................... B32B 7/12 428/323

(Continued)

FOREIGN PATENT DOCUMENTS

CN 108943932 A 12/2018
JP 2007152727 A 6/2007

(Continued)

OTHER PUBLICATIONS

English Translation of KR 20190075713 A-Polypropylene based film having improved barrier property and cell pouch comprising same; Youlchon Chemical Co LTD; Jul. 1, 2019 (Year: 2019).*

(Continued)

*Primary Examiner* — Adam J Francis
(74) *Attorney, Agent, or Firm* — Osha Bergman Watanabe & Burton LLP

(57) ABSTRACT

Disclosed is a specific stacked composition of a multi-layer film which is mainly used as a sealant layer of a cell pouch, has excellent adhesive performance, and simultaneously satisfies moldability in post-processing. The present invention provides a polypropylene-based multi-layer film including a skin layer including (a) a propylene-based binary copolymer, (f) a modified polyolefin, and (e) an anti-blocking agent, a core layer including (b1) an ethylene propylene block copolymer, and (c) an amorphous propylene rubber, and a seal layer including (a) a propylene-based binary copolymer, (b2) an ethylene propylene block copolymer, (d) a slip agent, and (e) an anti-blocking agent.

5 Claims, No Drawings

(56) References Cited

U.S. PATENT DOCUMENTS

2017/0092904 A1* 3/2017 Nakajima ............... B32B 15/09

FOREIGN PATENT DOCUMENTS

| | | | | | |
|---|---|---|---|---|---|
| KR | 2002-0030737 | A | | 4/2002 | |
| KR | 2003-0029141 | A | | 4/2003 | |
| KR | 101485523 | B1 | | 1/2015 | |
| KR | 101499740 | B1 | | 3/2015 | |
| KR | 20180092814 | A | * | 8/2018 | .......... H01M 10/052 |
| KR | 2019-0014532 | A | | 2/2019 | |
| KR | 2019-0047104 | A | | 5/2019 | |
| KR | 20190075713 | A | * | 7/2019 | .......... H01M 2/0287 |

OTHER PUBLICATIONS

English Translation of KR 20180092814 A-Lead sealant films and secondary batteries using the same; Nepes Co LTD; Aug. 20, 2018 (Year: 2018).*

International Search Report issued in International Application No. PCT/KR2021/016269 dated Feb. 15, 2022 (2 pages).

Written Opinion issued in International Application No. PCT/KR2021/016269 dated Feb. 15, 2022 (4 pages).

Office Action issued in Japanese Application No. 2023-526563, mailed on Aug. 20, 2025 (3 Pages).

Office Action issued in Chinese Application No. 2025072600073070, mailed on Jul. 26, 2025 (6 pages).

* cited by examiner

PROPYLENE-BASED MULTI-LAYER FILM FOR CELL POUCH, HAVING EXCELLENT ADHESIVE PERFORMANCE AND MOLDABILITY

TECHNICAL FIELD

The present invention relates to a polypropylene-based multi-layer film, and more specifically, to a polypropylene-based multi-layer film for a cell.

This application claims the benefit of Korean Patent Application No. 10-2020-0159121, filed on Nov. 24, 2020, in the Korean Intellectual Property Office, the disclosure of which is incorporated herein in its entirety by reference.

BACKGROUND ART

A secondary battery generally refers to a lithium secondary battery, and is a battery used in a portable terminal device such as a laptop, a smart phone, a tablet PC, and a video camera, an electric vehicle including a hybrid vehicle, a smart grid for energy storage, and the like, and research has been conducted to overcome various environmental factors such as a severe thermal environment and a mechanical impact while making the battery smaller, lighter, and thinner.

As a packaging material used for such a lithium battery, a pouch for a secondary battery is used as an exterior material having a multi-layered structure (e.g., an inner resin layer, an aluminum layer, and an outer resin layer) due to advantages of being different from a typical can-type packaging material and being able to freely change the shape of the battery. A commonly-used pouch film for a secondary battery is composed of a multi-layered structure sequentially having an inner resin layer composed of an adhesive layer by a polyolefin such as polyethylene (PE), casted polypropylene (cPP), polypropylene (PP), or the like, or a copolymer thereof, which has heat adhesion, thereby serving as a sealing agent, an aluminum layer, which is a metal foil layer serving as a substrate for maintaining mechanical strength and a barrier layer against moisture and oxygen, and an outer resin layer formed of a functional polymer film such as polyethylene terephthalate (PET), polyethylene naphthalate (PEN), nylon, a liquid crystal polymer (LCP) resin, or the like, which is to protect a battery cell from an external impact.

Typically, a packaging material in which a metal, aluminum in particular, is press-processed to be molded into a cylindrical or parallelepiped shape, or the like has been mainly used. However, in the case of such a metal-material can packaging material, there is a limitation in that the outer wall of a container is hard so that the shape of a battery itself is determined by the shape of the metal-material can packaging material.

In order to overcome such a limitation, a technology for packaging materials made of multi-layer plastic films has been developed. For example, Korean Patent Laid-Open Publication No. 2003-0029141 discloses a cell pouch formed of a base layer, an adhesive layer, a barrier layer, a dry lamination layer, and a sealant layer, wherein the sealant layer is composed of a low-fluidity polypropylene layer and a high-fluidity polypropylene layer, and Korean Patent Laid-Open Publication No. 2002-0030737 discloses a cell pouch in which a base film and a surface protection layer are laminated using biaxially stretched nylon, polyethylene terephthalate (PET) and polyolefin resins, and a technology of coating the base film with a fluorine-based, silicone-based, or acrylic resin as a secondary processing.

A pouch-type secondary battery may have flexibility in its form, and has the advantage of implementing a secondary battery of the same capacity with a smaller volume and mass. However, unlike a can-type secondary battery, the pouch-type secondary battery uses a soft pouch as a container, and thus may be damaged for various reasons in various processes. For example, during a process of accommodating an electrode assembly inside a pouch, a protruding portion such as an electrode tab or an electrode lead causes damage such as cracks to PP and cPP layers inside the pouch, and when an aluminum layer is exposed due to such damage, a side reaction occurs due to reactivity with an electrolyte solution. The aluminum layer exposed to the electrolyte solution as described above may be corroded by causing a chemical reaction with the electrolyte solution, and oxygen or moisture penetrated or diffused into a battery, through which a corrosive gas is generated, resulting in a problem of causing a swelling phenomenon in which the inside of the battery expands. Specifically, lithium hexafluorophosphate ($LiPF_6$) may react with water and oxygen to generate hydrofluoric acid (HF), which is a corrosive gas. The hydrofluoric acid may react with aluminum and cause a rapid exothermic reaction, and as a secondary reaction, when the hydrofluoric acid is adsorbed to the surface of the aluminum and penetrates into a tissue, the brittleness of the tissue increases so that cracks may be generated in a pouch film even by a micro-impact, and due to the leakage of the electrolyte solution, lithium and the atmosphere may react to cause ignition.

Korean Patent No. 1499740 discloses a polymer film for a cell packaging material including 1 wt % to 30 wt % of low-density polyethylene (LDPE), 50 wt % to 98 wt % of polypropylene (PP), and 1 wt % to 20 wt % of a cross-linked resin, wherein the LDPE is used to lower the penetration rate of an electrolyte solution, the PP is used to supplement heat resistance, and the cross-linked resin is used to increase the compatibility between LDPE and PP, but does not specifically disclose changes in physical properties in accordance with the molecular weight, density, melting point, degree of crystallinity, comonomer content, and the like.

Korean Patent No. 1485523 discloses an aluminum pouch film for a secondary battery including an outer resin layer composed of polyethylene terephthalate, nylon, etc., a first adhesive layer, an aluminum layer, a second adhesive layer, and an inner resin layer composed of polyolefin, but only describes the composition of the entire layer of a pouch, and does not discloses a specific composition of the polyolefin constituting the inner resin layer.

Korean Patent Laid-Open Publication No. 2019-0047104 discloses a polypropylene-based composite film including a layer A including, as a main component, a propylene-based random copolymer obtained by randomly copolymerizing propylene with ethylene or butene, a layer B composed of 60 wt % to 90 wt % of a propylene polymer having a comonomer (ethylene or butene) content of 0 wt % to 1.5 wt % and 10 wt % to 40 wt % of a propylene polymer having a comonomer (ethylene or butene) content of 10 wt % to 40 wt %, and a layer C composed of a propylene-based ethylene or butene random copolymer, wherein the layer B is characterized by including 100 ppm to 2000 ppm of a fatty acid amide-based lubricant and 0 wt % to 20 wt % of a metallocene catalyst-based low-density polyethylene, but does not specifically disclose the remaining raw materials other than the raw materials of the layer B.

DISCLOSURE OF THE INVENTION

Technical Problem

An aspect of the present invention provides a specific stacked composition of a multi-layer film which is mainly used as a sealant layer of a cell pouch, and has excellent adhesive performance and at the same time, satisfies moldability in post-processing.

Another aspect of the present invention provides a cell pouch using the multi-layer film as a sealant layer.

Technical Solution

According to an aspect of the present invention, there is provided a polypropylene-based multi-layer film including a skin layer including (a) a propylene-based binary copolymer, (f) a modified polyolefin, and (e) an anti-blocking agent, a core layer including (b1) an ethylene propylene block copolymer, and (c) an amorphous propylene rubber, and a seal layer including (a) a propylene-based binary copolymer, (b2) an ethylene propylene block copolymer, (d) a slip agent, and (e) an anti-blocking agent.

In addition, the polypropylene-based multi-layer film is characterized in that (a) the propylene-based binary copolymer includes ethylene in an amount of 2.0 wt % to 6.5 wt %, (b1) the ethylene propylene block copolymer includes ethylene in an amount of 2.0 wt % to 6.0 wt %, (b2) the ethylene propylene block copolymer includes ethylene in an amount of 6.0 wt % to 10.0 wt %, (c) the amorphous propylene rubber includes ethylene or butene in an amount of 10 wt % to 60 wt %, (d) the slip agent is an amide-based slip agent, (e) the anti-blocking agent is a spherical silica, and (f) the modified polyolefin is grafted with maleic anhydride in an amount of 1 wt % to 10 wt %.

In addition, the polypropylene-based multi-layer film is characterized in that (a) the propylene-based binary copolymer has a melt index MI (230° C., 2.16 kg load) of 2 g/10 min to 12 g/10 min, (b1) the ethylene propylene block copolymer has a melt index MI (230° C., 2.16 kg load) of 1 g/10 min to 5 g/10 min, (b2) the ethylene propylene block copolymer has a melt index MI (230° C., 2.16 kg load) of 1 g/10 min to 5 g/10 min, (c) the amorphous propylene rubber has a melt index MI (230° C., 2.16 kg load) of 1 g/10 min to 5 g/10 min, (d) the slip agent is a mixture of two or more of amide-based slip agents having 14 to 22 carbon atoms, and (e) the anti-blocking agent is particles having an average particle diameter of 1.5 μm to 3.0 μm, and a water content of less than 0.5 wt %, wherein the bulk density of the particles is 0.8 g/cm$^3$ to 1.0 g/cm$^3$.

In addition, the polypropylene-based multi-layer film is characterized in that the skin layer includes (a) the propylene-based binary copolymer in an amount of 80 parts by weight to 99 parts by weight, (f) the modified polyolefin in an amount of 1 part by weight to 20 parts by weight, and (e) the anti-blocking agent in an amount of 0.1 parts by weight to 1 part by weight, the core layer includes (b1) the ethylene propylene block copolymer in an amount of 50 parts by weight to 90 parts by weight, and (c) the amorphous propylene rubber in an amount of 10 parts by weight to 50 parts by weight, and the seal layer includes (a) the propylene-based binary copolymer in an amount of 20 parts by weight to 60 parts by weight, (b2) the ethylene propylene block copolymer in an amount of 40 parts by weight to 80 parts by weight, (d) the slip agent in an amount of 0.1 parts by weight to 1 part by weight, and (e) the anti-blocking agent in an amount of 0.1 parts by weight to 1.0 part by weight.

In addition, the polypropylene-based multi-layer film is characterized in that the multi-layer film has a friction coefficient (ASTM D1894, 40 μm thick, based on the surface of the seal layer) of 0.5 or less, an aluminum peel strength of 8 N/15 mm or greater as measured according to a method below, and a thermal adhesion strength of 60 N/15 mm as measured according to a method below.

[Method for Measuring Aluminum Peel Strength]

The multi-layer film (40 μm thick), an aluminum foil (50 μm thick, stacked on the skin layer of the multi-layer film), and nylon (15 μm thick, stacked on the aluminum foil) are combined at 130° C. and cured at 50° C. for 14 days, and the cured combined film is cut to a width of 15 mm to measure the peel strength at a peel angle of 180° at a peel rate of 50 mm/min at 23° C.

[Method of Measuring Thermal Adhesion Strength]

A sample prepared by thermal adhesion under a pressure of 2 kgf/cm$^2$ for 1 second such that layers of the multi-layer film of the combined film face each other is cut to a width of 15 mm to measure the peel strength at a peeling angle of 180° at a peel rate of 100 mm/min at 23° C. through a tensile strength measuring device.

According to another aspect of the present invention, there is provided a cell pouch including a sealant layer formed of the film, a barrier layer formed on the sealant layer, and an external resin layer formed on the barrier layer.

Advantageous Effects

According to the present invention, there may be proposed a specific stacked composition of a polypropylene-based multi-layer film including a skin layer, a core layer, and a seal layer in a specific composition, wherein the polypropylene-based multi-layer film is used as a sealant layer of a cell pouch, and has excellent adhesive performance and at the same time, satisfies moldability in post-processing while having excellent mechanical properties, surface properties, and transparency.

MODE FOR CARRYING OUT THE INVENTION

Hereinafter, the present invention will be described in detail with reference to preferred embodiments. Prior to this, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention. Therefore, the configurations of the embodiments described herein are merely the most preferred embodiments of the present invention, and are not intended to limit the technical idea of the present invention. Therefore, it should be understood that there may be various equivalents and modifications that may substitute the embodiments at the time of the present application.

The inventors of the present invention have faced the fact that a specific composition is not known for a film material simultaneously satisfying adhesive performance and moldability in post-processing, which are required as a material used as a sealant layer of a typical cell pouch, and have repeatedly conducted research on numerous stacked compositions, and as a result, have found that when a propylene-based binary copolymer is used as a sealant layer of a cell pouch in a specific composition of a skin layer, a core layer, and a seal layer, the adhesive performance is excellent and at the same time, the moldability in post-processing is satisfied, while achieving excellent mechanical properties, surface properties, and transparency, and have reached the present invention.

Therefore, the present invention discloses polypropylene-based multi-layer film including a skin layer including (a) a propylene-based binary copolymer, (f) a modified polyolefin, and (e) an anti-blocking agent, a core layer including (b1) an ethylene propylene block copolymer, and (c) an amorphous propylene rubber, and a seal layer including (a) a propylene-based binary copolymer, (b2) an ethylene propylene block copolymer, (d) a slip agent, and (e) an anti-blocking agent.

In the present invention, (a) the propylene-based binary copolymer is a main component of the skin layer and the seal layer of the multi-layer film, and is a copolymer of propylene and one kind of an α-olefin other than the propylene, and preferably, may be a binary copolymer in which propylene and ethylene are simultaneously injected and polymerized. The polymerization method of the copolymer is a method commonly known in the art, and is not particularly limited in the present invention.

(a) The propylene-based binary copolymer may include the same propylene as an olefin-based adhesive component as a constituent component, and thus, may contribute to the improvement in aluminum peel strength, and (a) the propylene-based binary copolymer is a crystalline copolymer, not an amorphous propylene-ethylene copolymer, and may preferably include 2 wt % to 6.5 wt % of ethylene, more preferably 2.5 wt % to 3.5 wt % of ethylene, and may preferably have a melting point (Tm) of 125° C. to 155° C., more preferably 140° C. to 154° C. If the ethylene content of the propylene-based binary copolymer is less than 2% by weight, whitening and edge bursting may occur during forming due to lack of softness, and wetting in a combining process with an adhesive may be degraded. In addition, if the ethylene content is greater than 6.5 wt %, appearance problems (deformation and distortion) due to heat generation during use may occur due to lack of heat resistance.

Meanwhile, (a) the propylene-based binary copolymer may have a melt index MI (230° C., 2.16 kg load) of 2 g/10 min to 12 g/10 min, preferably 2 g/10 min to 8 g/10 min, and more preferably 5 g/10 min to 8 g/10 min. If the melt index is less than 2 g/10 min, productivity may be degraded, and if greater than 12 g/10 min, the effect of improving aluminum peel strength may be insignificant.

In the present invention, (b1) the ethylene propylene block copolymer is a main component of the core layer of the multi-layer film, and has the same constituent materials as those of (a) the propylene-based binary copolymer, so that due to the affinity of the two phases, delamination does not occur. The polymerization method of (b1) the ethylene propylene block copolymer is a method commonly known in the art, and is not particularly limited in the present invention.

(b1) The ethylene propylene block copolymer preferably includes ethylene in an amount of 2 wt % to 6 wt %, and more preferably, may include ethylene in an amount of 4 wt % to 6 wt %. If the ethylene content of (b1) the ethylene propylene block copolymer is less than 2 wt %, the effect of improving impact resistance may be insignificant, and if greater than 6 wt %, a large number of fish eyes may be generated due to non-dispersion.

Meanwhile, (a) the ethylene propylene block copolymer may have a melt index MI (230° C., 2.16 kg load) of 1 g/10 min to 5 g/10 min, and preferably 2 g/10 min to 5 g/10 min. If the melt index is less than 1 g/10 min, a large number of fish eyes may be generated due to non-dispersion, and if greater than 5 g/10 min, the effect of improving impact resistance may be insignificant.

In the present invention, (b2) the ethylene propylene block copolymer is a main component of the seal layer of the multi-layer film, and has the same constituent materials as those of (a) the propylene-based binary copolymer, so that due to the affinity of the two phases, compatibility in the layer is excellent, thereby increasing quality uniformity. The polymerization method of (b2) the ethylene propylene block copolymer is a method commonly known in the art, and is not particularly limited in the present invention.

(b2) The ethylene propylene block copolymer preferably includes ethylene in an amount of 6 wt % to 10 wt %, and more preferably, may include ethylene in an amount of 6 wt % to 8 wt %. If the ethylene content of (b2) the ethylene propylene block copolymer is less than 6 wt %, sufficient thermal adhesion strength is not expressed during thermal adhesion, and if greater than 10 wt %, thermal adhesion strength is degraded due to thermal fusion between thermal adhesive layers during thermal adhesion.

(b2) The ethylene propylene block copolymer may have a melt index MI (230° C., 2.16 kg load) of 1 g/10 min to 5 g/10 min, and preferably 2 g/10 min to 5 g/10 min. If the melt index is less than 1 g/10 min, a large number of fish eyes may be generated due to non-dispersion, and if greater than 5 g/10 min, the effect of improving impact resistance may be insignificant.

In the present invention, (c) the amorphous propylene rubber is an accessory component of the core layer of the multi-layer film, and is a copolymer of propylene and one kind of an α-olefin other than the propylene, and preferably, propylene and ethylene or butene are simultaneously injected, wherein the ethylene or butene is included in an amount of 10 wt % to 60 wt %, and more preferably, the ethylene is included in an amount of 10 wt % to 30 wt %, or the butene is included in an amount of 20 wt % to 40 wt %. If the ethylene or butene content is 10 wt % or less, the effect of improving impact resistance may be insignificant, and if greater than 60 wt %, a large amount of low molecules are included, making it sticky during film molding, thereby making the surface of a film uneven, and tensile strength may be lowered. The polymerization method of the copolymer is a method commonly known in the art, and is not particularly limited in the present invention.

In the present invention, (d) the slip agent and (e) the anti-blocking agent are accessory components of the seal layer of the multi-layer film, and in the case of (d) the slip agent, the corresponding organic compound moves to the surface of a base material over time in the seal layer to impart slip properties, thereby lowering a friction coefficient in post-processing processes such as deep drawing to serve to improve formability and workability, and (e) the anti-blocking agent forms irregularities on the surface of the film, thereby alleviating a sticky (blocking) phenomenon in post-processing processes such as deep drawing to serve to improve moldability and workability.

(d) The slip agent is preferably an amide-based organic compound synthesized from a fatty acid, and has a high melting point, and has a neutral structure in which a hydroxyl group is substituted with an amino structure.

(d) The slip agent is a mixture of two or more of amide-based slip agents having 14 to 22 carbon atoms, and more preferably, a mixture of tetradecanamide, hexadecanamide, octadecanamide, and 13-cis-docosenamide, which are saturated and unsaturated amide-based organic compounds having 14 to 22 carbon atoms.

(e) The anti-blocking agent is preferably a silica anti-blocking agent in which particles have a spherical shape and a uniform particle distribution, and in addition, it is preferable that the particles have a moisture content of less than 0.5 wt % when dried (under the conditions of 105° C. and 60 min), have an average particle diameter of 1.5 μm to 3.0 μm, preferably 2 μm to 3 μm, and have a bulk density of 0.8 $g/cm^3$ to 1.0 $g/cm^3$.

(f) The modified polyolefin is an accessory component of the skin layer of the multi-layer film, and may be a modified polypropylene grafted with maleic anhydride, which is a polar functional group, in an amount of 1 wt % to 10 wt %, preferably 3 wt % to 5 wt %. If the content of the maleic anhydride of the modified polypropylene is less than 1 wt %, adhesion with an aluminum foil may be degraded, and if greater than 10 wt %, due to a large amount of polar functional groups, fish eyes are generated and small molecules are generated, so that after corona surface-treatment, surface tension may be lowered, thereby degrading adhesion with an aluminum foil.

The above (a) to (f) components constitute the main components or accessory components of the skin layer, the core layer, and the seal layer, and may be included in a specific content ratio to implement desired adhesive performance and moldability in post-processing when used in a sealant layer of a cell pouch.

That is, in the present invention, the skin layer may include (a) a propylene-based binary copolymer in an amount of 80 parts by weight to 99 parts by weight, (f) a modified polyolefin in an amount of 1 part by weight to 20 parts by weight, and (e) an anti-blocking agent in an amount of 0.1 parts by weight to 1 part by weight, the core layer may include (b1) an ethylene propylene block copolymer in an amount of 50 parts by weight to 90 parts by weight, and (c) an amorphous propylene rubber in an amount of 10 parts by weight to 50 parts by weight, and the seal layer may include (a) a propylene-based binary copolymer in an amount of 20 parts by weight to 60 parts by weight, (b2) an ethylene propylene block copolymer in an amount of 40 parts by weight to 80 parts by weight, (d) a slip agent in an amount of 0.1 parts by weight to 1.0 part by weight, and (e) an anti-blocking agent in an amount of 0.1 parts by weight to 1.0 part by weight, and preferably, the skin layer may include (a) the propylene-based binary copolymer in an amount of 87 parts by weight to 93 parts by weight, (f) the modified polyolefin in an amount of 7 parts by weight to 13 parts by weight, and (e) the anti-blocking agent in an amount of 0.1 parts by weight to 0.9 parts by weight, the core layer may include (b1) the ethylene propylene block copolymer in an amount of 65 parts by weight to 85 parts by weight, and (c) the amorphous propylene rubber in an amount of 15 parts by weight to 35 parts by weight, and the seal layer may include (a) the propylene-based binary copolymer in an amount of 25 parts by weight to 55 parts by weight, (b2) the ethylene propylene block copolymer in an amount of 45 parts by weight to 75 parts by weight, (d) the slip agent in an amount of 0.1 parts by weight to 0.4 parts by weight, and (e) the anti-blocking agent in an amount of 0.1 parts by weight to 0.3 parts by weight.

Meanwhile, as long as the resin composition of each layer constituting the polypropylene-based multi-layer film according to the present invention does not impair the purpose of the present invention, one or more of various additives such as an antioxidant, a catalyst neutralizer, a pigment, a dispersant, anti-weathering agent, an anti-static agent, UV stabilizer, talc, and the like may be additionally contained. The amount of each of such additives may be adjusted in consideration of a total preparation amount, a preparation process, and the like within a range known to be used in preparing a polypropylene-based multi-layer film according to the present invention without affecting the properties of the film.

In the present invention, the preparation of a multi-layer film using the above components may be in accordance with a method commonly known in the art. For example, the components constituting each layer may be introduced into a Henschel mixer and mixed in respective required amounts, prepared in a pellet phase at 180° C. to 240° C. using an extruder, and melt-molded into a film through a multi-layer film molding machine to prepare a multi-layer.

When the polypropylene-based multi-layer film according to the present invention is used as sealant layer of a cell pouch, the adhesive performance is excellent and at the same time, the moldability in post-processing is satisfied, while achieving excellent mechanical properties, surface properties, and transparency, and specifically, the polypropylene-based multi-layer film according to the present invention may have a tensile strength (ASTM D638) of 140 MPa or greater, preferably 142 MPa or greater, and a surface-treatment strength (ASTM D2578-09, based on the surface of the skin layer surface) of 40 dyne or greater, preferably 42 dyne or greater, a friction coefficient (ASTM D1894, 40 μm thick, based on the surface of the skin layer) of 0.5 or less, preferably 0.3 or less, a haze (40 μm thick) of 20% or less, preferably 18% or less, an aluminum peel strength as measured according to a method below of 8 N/15 mm or greater, preferably 10 N/15 mm or greater, and a thermal adhesion strength as measured according to a method below of 60 N/15 mm or greater, preferably 73 N/15 mm or greater.

[Method for Measuring Aluminum Peel Strength]

The multi-layer film (40 μm thick), an aluminum foil (50 μm thick, stacked on the skin layer of the multi-layer film), and nylon (15 μm thick, stacked on the aluminum foil) are combined at 130° C. and cured at 50° C. for 14 days, and the cured combined film is cut to a width of 15 mm to measure the peel strength at a peel angle of 180° at a peel rate of 50 mm/min at 23° C.

[Method of Measuring Thermal Adhesion Strength]

A sample prepared by thermal adhesion under a pressure of 2 $kgf/cm^2$ for 1 second such that layers of the multi-layer film of the combined film face each other is cut to a width of 15 mm to measure the peel strength at a peeling angle of 180° at a peel rate of 100 mm/min at 23° C. through a tensile strength measuring device.

The polypropylene-based multi-layer film according to the present invention may be mainly applied to cell pouch molding, but is not limited thereto, and may be applied to molding of, for example, a packaging film, a retort pouch, an electronic material pouch, and the like.

Hereinafter, the present invention will be described in more detail through specific Preparation Examples, Examples, and Comparative Examples.

Preparation Examples (1) (a) Preparation of Propylene-Based Binary Copolymer

Propylene and ethylene were injected into a reaction device to be subjected to a bulk polymerization reaction, and a propylene-based binary copolymer was prepared such that the ethylene content in the copolymer was 3 wt %.

(2) (b1) Preparation of Ethylene Propylene Block Copolymer

Propylene was injected into a reaction device to be polymerized, and then propylene and ethylene were injected into a gas-phase reactor to be subjected to a bulk polymerization reaction, thereby preparing a propylene-based block copolymer such that the ethylene content in the block copolymer was 5.5 wt %.

(3) (b2) Preparation of Ethylene Propylene Block Copolymer

Propylene was injected into a reaction device to be polymerized, and then propylene and ethylene were injected into a gas-phase reactor to be subjected to a bulk polymerization reaction, thereby preparing a propylene-based block copolymer such that the ethylene content in the block copolymer was 6 wt %.

Examples 1 to 4 and Comparative Examples 1 to 4

A propylene-based copolymer mixed resin composition was prepared for each layer by performing melt-mixing and pelletization through a single-screw extruder at 220° C. using composition ratios of Table 1 below (unit: parts by weight, a phenolic antioxidant commonly added, a phosphate-based antioxidant, and a hydrotalcite added as a catalyst neutralizer). Thereafter, the prepared mixed resin composition for each layer was melt-molded through a multi-layer film molding machine at 220° C. to be formed into a film, thereby preparing a multi-layer film having a thickness of 40 μm (skin layer:core layer:seal layer thickness ratio of 1:3:1).

Test Example

The prepared pellets and films were used to prepare specimens and to measure or evaluate physical properties of the specimens according to a method below, and the results are shown in Table 1 below.

[Method for Measuring or Evaluating Physical Properties]

(1) Melt Index

The measurement was performed under the condition of 230° C. and a 2.16 kg load in accordance with ASTM-D 1238.

(2) Melting Point (Tm)

10 mg of a test piece was pre-melted for 5 minutes at 220° C. under a nitrogen gas atmosphere using a differential scanning calorimeter (trade name: DSC, manufactured by Perkin-Elmer Co.), and then the temperature was dropped to 40° C. at a temperature decrease rate of 5° C./min. Thereafter, the temperature was raised at a temperature increase rate of 5° C./min, and the peak temperature of the maximum peak of the obtained melting endothermic curve was defined as the melting point (Tm). In addition, the melting point of indium (In) measured by using the above measuring device at a temperature increase rate of 5° C. was 156.6° C.

(3) Ethylene Content

Using an infrared absorption spectrum (FT-IR), the ethylene content was measured using 720 and 730 cm-1 characteristic peaks.

(4) Tensile Strength

The measurement was performed in accordance with ASTM D638.

(5) Surface Treatment Strength

The measurement was performed in accordance with ASTM D2578-09.

(6) Friction Coefficient

A film having a thickness of 40 μm was measured in accordance with the ASTM D1894 method.

(7) Haze

A film having a thickness of 40 μm was measured in accordance with the ASTM D1003 method.

(8) Aluminum Peel Strength

The multi-layer film (40 μm thick), an aluminum foil (50 μm thick, stacked on the skin layer of the multi-layer film), and nylon (15 μm thick, stacked on the aluminum foil) were combined at 130° C. and cured at 50° C. for 14 days, and the cured combined film was cut to a width of 15 mm to measure the peel strength at a peel angle of 180° at a peel rate of 50 mm/min at 23° C.

(9) Thermal Adhesion Strength

A sample prepared by thermal adhesion under a pressure of 2 kgf/cm$^2$ for 1 second such that layers of the multi-layer film of the combined film faced each other was cut to a width of 15 mm to measure the peel strength at a peeling angle of 180° at a peel rate of 100 mm/min at 23° C. through a tensile strength measuring device.

(10) Anti-Electrolyte Solution Properties

The specimen used for measuring the thermal adhesion strength was immersed in an electrolyte solution at 85° C. for 75 hours, and then the peel strength thereof was measured in the same manner as in the method for measuring the thermal adhesion strength, and when the peel strength after the immersion in the electrolyte solution compared to the peel strength before the immersion in the electrolyte solution was 90 parts or more, it was denoted by '◎', when 70 parts to 90 parts, it was denoted by 'Δ', and when less than 70 parts, it was denoted by 'X'. The composition of the electrolyte solution was [EC/DEC/DMC=1/1/1 (v/v parts)+ $LiPF_6$ (1 mol/L)+$H_2O$ 300 ppm], wherein EC is ethylene carbonate, DEC is diethyl carbonate, DMC is dimethyl carbonate.

(11) Forming Performance

The combined film was placed on a frame-type metal mold (10 cm×10 cm) with the nylon surface touching an edge of the mold, and the multi-layer film surface was pressed with a square pendulum to perform drawing up to a depth of at least 9 mm, and when there was 0 burst in a corner portion of the combined film, it was denoted by '◎', when there were 1 to 3 bursts, it was denoted by 'Δ', and when there were 4 bursts, it was denoted by 'x'.

TABLE 1

| Classification | | Example 1 | Example 2 | Example 3 | Example 4 |
|---|---|---|---|---|---|
| Layer composition | Skin (parts by weight) | (a) 90 + (f) 10 + (e) 0.1 | (a) 95 + (f) 5 + (e) 0.1 | (a) 90 + (f) 10 + (e) 0.1 | (a) 90 + (f) 10 + (e) 0.1 |
| | Core (parts by weight) | (b1) 80 + (c) 20 | (b1) 80 + (c) 20 | (b1) 70 + (c) 30 | (b1) 80 + (c) 20 |
| | Seal (parts by weight) | (a) 50 + (b2) 50 + (d) 0.2 + (e) 0.1 | (a) 50 + (b2) 50 + (d) 0.2 + (e) 0.1 | (a) 50 + (b2) 50 + (d) 0.2 + (e) 0.1 | (a) 30 + (b2) 70 + (d) 0.2 + (e) 0.1 |
| Physical properties | Film tensile strength (MPa) | 150 | 156 | 142 | 160 |
| | Surface-treatment | 43 | 44 | 43 | 43 |

TABLE 1-continued

| | | | | | |
|---|---|---|---|---|---|
| | strength (dyne) (Skin surface) | | | | |
| | Friction coefficient (Seal surface) | 0.2 | 0.2 | 0.2 | 0.2 |
| | Haze (%) | 15 | 12 | 15 | 18 |
| | Aluminum peel strength (N/15 mm) | 12 | 10 | 12 | 12 |
| | Thermal adhesion strength (N/15 mm) | 78 | 75 | 78 | 73 |
| | Anti-electrolyte solution properties | ◎ | ◎ | ◎ | ◎ |
| | Forming performance | ◎ | ◎ | ◎ | ◎ |

| Classification | | Comparative Example 1 | Comparative Example 2 | Comparative Example 3 | Comparative Example 4 |
|---|---|---|---|---|---|
| Layer composition | Skin (parts by weight) | (a) 100 + (e) 0.1 | (a) 90 + (f) 10 + (e) 0.1 | (a) 90 + (f) 10 + (e) 0.1 | (a) 90 + (f) 10 + (e) 0.1 |
| | Core (parts by weight) | (b1) 80 + (c) 20 | (b1) 100 | (b1) 80 + (c) 20 | (b1) 80 + (c) 20 |
| | Seal (parts by weight) | (a) 50 + (b2) 50 + (d) 0.2 + (e) 0.1 | (a) 50 + (b2) 50 + (d) 0.2 + (e) 0.1 | (a) 100 + (d) 0.2 + (e) 0.1 | (a) 50 + (b2) 50 |
| Physical properties | Film tensile strength (Mpa) | 150 | 162 | 145 | 150 |
| | Surface-treatment strength (dyne) (Skin surface) | 44 | 43 | 43 | 44 |
| | Friction coefficient (Seal surface) | 0.2 | 0.2 | 0.2 | 0.6 |
| | Haze (%) | 15 | 20 | 10 | 15 |
| | Aluminum peel strength (N/15 mm) | 4 | 10 | 11 | 11 |
| | Thermal adhesion strength (N/15 mm) | 78 | 70 | 60 | 70 |
| | Anti-electrolyte solution properties | ◎ | ◎ | ◎ | ◎ |
| | Forming performance | ◎ | X | ◎ | Δ |

(a) Propylene-based binary copolymer: Tm 144° C. to 152° C., MI 5 g/10 min to 8 g/10 min (b1) Ethylene propylene block copolymer: MI 2 g/10 min to 5 g/10 min (b2) Ethylene propylene block copolymer: MI 2 g/10 min to 5 g/10 min (c) Amorphous propylene rubber: Ethylene 10 wt % to 30 wt %, butene 20 wt % to 40 wt %, and MI 2 g/10 min to 4 g/10 min (d) Slip agent: saturated or unsaturated amide-based slip agent (a mixture of two or more of amide-based slip agents among tetradecanamide, hexadecanamide, octadecanamide, and 13-cis-docosenamide)

(e) Anti-blocking agent: spherical silica particles having a water content of less than 0.5 wt %, an average particle diameter of 2 μm to 3 μm, and a bulk density 0.8 g/cm$^3$ to 1.0 g/cm$^3$ (f) Modified polyolefin: polyolefin grafted with maleic anhydride in an amount of 3 wt % to 5 wt %

Referring to Table 1, when the polypropylene-based multi-layer film including a skin layer, a core layer, and a seal layer in a specific composition according to the present invention was used as a sealant layer of a cell pouch, it has been confirmed that the adhesive performance is excellent (see the aluminum peel strength and thermal adhesion strength), and at the same time, the moldability in post-processing is satisfied (see the forming performance), while implementing excellent mechanical properties, surface properties, and transparency. However, in terms of the aluminum peel strength, when the skin layer is formed by mixing (a) a propylene-based binary copolymer, (e) an anti-blocking agent, and (f) a modified polyolefin, it can be seen that it is more preferable to mix a relatively large amount of (f) the modified polyolefin (Examples 1, 3 and 4) than to mix a relatively small amount of (f) the modified polyolefin (Example 2), and it can be seen that it is more preferable when (f) the modified polyolefin (a) is replaced with (a) the propylene-based binary copolymer.

In this regard, when (a) the propylene-based binary copolymer is used alone as the main component of the seal layer (Comparative Example 3) instead of the mixture of (a) the propylene-based binary copolymer and (b2) the ethylene propylene block copolymer, it can be seen that the thermal adhesion strength is slightly degraded with a decrease in tensile strength of the film. In addition, when (c) the amorphous propylene-based rubber, which is an accessory component of the core layer, is replaced with (b1) the ethylene propylene block copolymer (Comparative Example 2), the stiffness of the film increases, thereby increasing the tensile strength, but it can be seen that the moldability in post-processing is significantly degraded. In addition, when the seal layer does not include (d) the slip agent and (e) the anti-blocking agent (Comparative Example 4), the moldability in the post-processing is degraded, so that the processability during production may be degraded.

From the above, it can be seen that in a multi-layer film used as a sealant layer of a cell pouch, there is a specific stacked composition satisfying adhesive performance and moldability in post-processing together with all of excellent mechanical properties, surface properties, and transparency, and it can be confirmed that the polypropylene-based multi-layer film including a skin layer, a core layer, and a seal layer according to the present invention may sufficiently satisfy the above.

The preferred embodiments of the present invention have been described in detail. The description of the present invention has been presented for purposes of illustration, and it will be understood by those skilled in the art that various changes in form and details may be made therein without departing from the spirit and scope of the invention.

Therefore, the scope of the present invention is represented by the following claims rather than the above detailed description, and all changes and changed forms derived from the meaning, scope, and equivalent concepts of the claims should be construed as being included in the scope of the present invention.

The invention claimed is:

1. A polypropylene-based multi-layer film comprising:

a skin layer including (a) a propylene-based binary copolymer, (f) a modified polyolefin, and (e) an anti-blocking agent;

a core layer including (b1) an ethylene propylene block copolymer, and (c) an amorphous propylene rubber; and a seal layer including (a) a propylene-based binary copolymer, (b2) an ethylene propylene block copolymer, (d) a slip agent, and (e) an anti-blocking agent, wherein:

(a) the propylene-based binary copolymer comprises ethylene in an amount of 2.0 wt % to 6.5 wt %;

(b1) the ethylene propylene block copolymer comprises ethylene in an amount of 2.0 wt % to 6.0 wt %;

(b2) the ethylene propylene block copolymer comprises ethylene in an amount of 6.0 wt % to 10.0 wt %;

(c) the amorphous propylene rubber comprises ethylene or butene in an amount of 10.0 wt % to 60.0 wt %;

(d) the slip agent is an amide-based slip agent;

(e) the anti-blocking agent is a spherical silica; and (f) the modified polyolefin is grafted with maleic anhydride is in an amount of 1.0 wt % to 10.0 wt %.

2. The polypropylene-based multi-layer film of claim 1, wherein:

(a) the propylene-based binary copolymer has a melt index MI (230° C., 2.16 kg load) of 2 g/10 min to 12 g/10 min;

(b1) the ethylene propylene block copolymer has a melt index MI (230° C., 2.16 kg load) of 1 g/10 min to 5 g/10 min;

(b2) the ethylene propylene block copolymer has a melt index MI (230° C., 2.16 kg load) of 1 g/10 min to 5 g/10 min;

(c) the amorphous propylene rubber has a melt index MI (230° C., 2.16 kg load) of 1 g/10 min to 5 g/10 min;

(d) the slip agent is a mixture of two or more of amide-based slip agents having 14 to 22 carbon atoms; and (e) the anti-blocking agent is particles having an average particle diameter of 1.5 μm to 3.0 μm, and a water content of less than 0.5 wt %, wherein the bulk density of the particles is 0.8 g/cm$^3$ to 1.0 g/cm$^3$.

3. The polypropylene-based multi-layer film of claim 1, wherein:

the skin layer comprises (a) the propylene-based binary copolymer in an amount of 80 parts by weight to 99 parts by weight, (f) the modified polyolefin in an amount of 1 part by weight to 20 parts by weight, and (e) the anti-blocking agent in an amount of 0.1 parts by weight to 1 part by weight;

the core layer comprises (b1) the ethylene propylene block copolymer in an amount of 50 parts by weight to 90 parts by weight, and (c) the amorphous propylene rubber in an amount of 10 parts by weight to 50 parts by weight; and the seal layer comprises (a) the propylene-based binary copolymer in an amount of 20 parts by weight to 60 parts by weight, (b2) the ethylene propylene block copolymer in an amount of 40 parts by weight to 80 parts by weight, (d) the slip agent in an amount of 0.1 parts by weight to 1.0 part by weight, and (e) the anti-blocking agent in an amount of 0.1 parts by weight to 1.0 part by weight.

4. The polypropylene-based multi-layer film of claim 1, wherein:

the multi-layer film has a friction coefficient (ASTM D1894, 40 μm thick, based on the surface of the seal layer) of 0.5 or less, an aluminum peel strength of 8 N/15 mm or greater as measured according to a method below, and a thermal adhesion strength of 60 N/15 mm as measured according to a method below:

[Method for measuring aluminum peel strength]

the multi-layer film (40 μm thick), an aluminum foil (50 μm thick, stacked on the skin layer of the multi-layer film), and nylon (15 μm thick, stacked on the aluminum foil) are combined at 130° C. and cured at 50° C. for 14 days, and the cured combined film is cut to a width of 15 mm to measure the peel strength at a peel angle of 180° at a peel rate of 50 mm/min at 23° C.; and

[Method of measuring thermal adhesion strength]

a sample prepared by thermal adhesion under a pressure of 2 kgf/cm$^2$ for 1 second such that layers of the multi-layer film of the combined film face each other is cut to a width of 15 mm to measure the peel strength at a peeling angle of 180° at a peel rate of 100 mm/min at 23° C. through a tensile strength measuring device.

5. A cell pouch comprising:

a sealant layer formed of the film of claim 1;

a barrier layer formed on the sealant layer; and an external resin layer formed on the barrier layer.

* * * * *